UNITED STATES PATENT OFFICE.

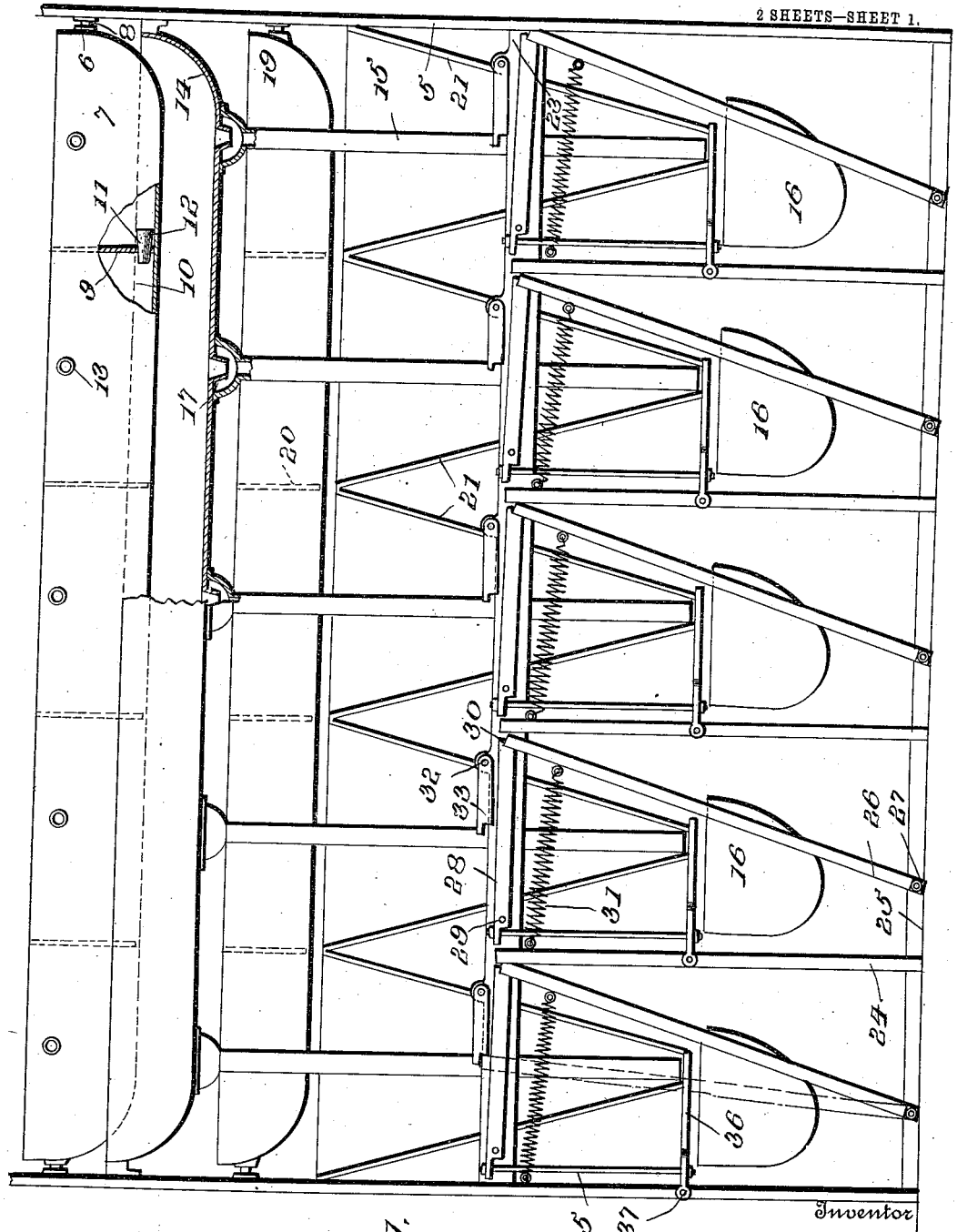

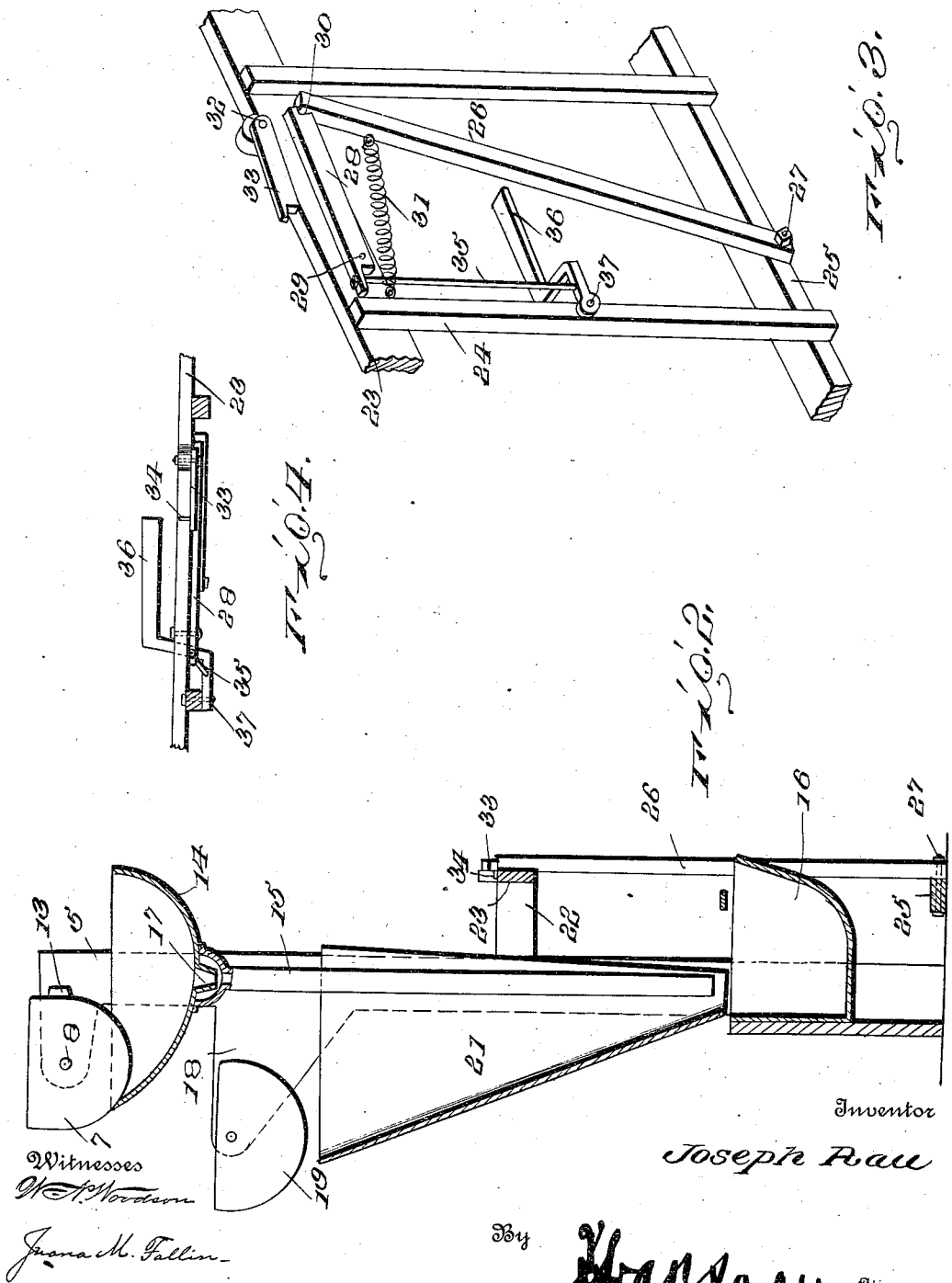

JOSEPH RAU, OF FAYETTE, IOWA, ASSIGNOR OF ONE-HALF TO FRANK RAU, OF FAYETTE, IOWA.

AUTOMATIC CALF-FEEDER.

1,019,087. Specification of Letters Patent. Patented Mar. 5, 1912.

Application filed January 7, 1911. Serial No. 601,358.

*To all whom it may concern:*

Be it known that I, JOSEPH RAU, citizen of the United States, residing at Fayette, in the county of Fayette and State of Iowa, have invented certain new and useful Improvements in Automatic Calf-Feeders, of which the following is a specification.

This invention relates to automatic calf feeders and has for its object the provision of a comparatively simple and thoroughly efficient device of this character, by means of which a number of calves or other animals may be fed at one time, each calf eating from a separate trough and receiving an equal amount of feed.

A further object of the invention is to provide a calf feeder including superposed receptacles, one of which is adapted to contain milk and the other oats or other grain, means being provided for directing the milk and oats downwardly in predetermined quantities to the respective feed troughs.

A further object is to provide a calf feeder having stanchions arranged at the feed troughs thereof so that each calf may eat without interference.

A further object is to provide a trip lever operatively connected with each stanchion and actuated by contact with the neck of an animal to automatically close said stanchion.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a front elevation of an automatic stock feeder, constructed in accordance with my invention; Fig. 2 is a vertical sectional view of the same; Fig. 3 is a perspective view of one of the stanchions detached; Fig. 4 is a top plan view of Fig. 3.

Corresponding and like parts are referred to in the following description and indicated in all the views of the drawings by the same reference characters.

The improved calf feeder forming the subject matter of the present invention comprises a main supporting frame 5, to the inner faces of the upright or side bars of which are secured in any suitable manner, sockets 6.

Pivotally mounted for swinging movement between the side bars of the frame 5, is a trough or receptacle 7 adapted to receive and contain a quantity of milk, said receptacle being provided with oppositely disposed trunnions 8 fitting within the sockets 6 so as to permit the receptacle to swing freely on the supporting frame.

Extending transversely of the receptacle 7, are a plurality of partitions 9 defining intermediate compartments 10, there being an opening 11 formed in the lower portion of each partition and adapted to receive a removable plug or stopper, indicated at 12. Extending laterally from the receptacle 7 at each compartment 10, is a nozzle 13, through which the milk in the compartment is discharged into a stationary receiving trough 14 when the receptacle 7 is tilted.

The trough 14 is rigidly secured to the side walls of the main supporting frame 5 beneath the receptacle 7 and is provided with a plurality of depending spouts 15 for directing the milk into the feed troughs, indicated at 16, there being one of said feed troughs for each compartment 10. The bottom of the stationary receiving trough 14 is formed with a plurality of depending nipples 17 which extend within the adjacent spouts 15 so as to assist in draining said trough.

Pivotally mounted on suitable arms 18 extending laterally from the main frame, is a movable receptacle 19 adapted to contain oats, grain or other solid feed, said receptacle being preferably provided with partitions 20, although these partitions may be omitted if desired.

Arranged beneath the auxiliary receptacle 19, are a plurality of downwardly inclined chutes 21 for directing the oats or other grain into the feed troughs 16 when said receptacle is tilted.

Arranged at the front of the main frame 5, is an auxiliary frame 22 including spaced end bars connected by a longitudinally disposed bar 23 on which are mounted a plurality of stanchions, one of said stanchions being preferably disposed in front of each feed trough 16. Each stanchion comprises a stationary member or bar 24 having its upper and lower ends rigidly secured to the bar 23 and a similar bar 25, and a movable member or bar 26, the lower end of which is pivotally mounted at 27 on the lower bar 25, as best shown in Fig. 1 of the drawings.

The movable member 26 of each stanchion is normally held in open position by means of a latch bar 28 pivotally mounted at 29 on the upper connecting bar 23 and having its free end provided with a notch 30 adapted to bear against the upper end of the adjacent movable member 26, there being a coil spring 31 interposed between the stationary and movable members of each stanchion for automatically moving the members 26 to closed position when the latch bars 28 are released.

Arranged above each feed trough 16 and pivotally mounted at 32 on the connecting bar 23, is a locking member 33 adapted to engage the upper end of the adjacent movable member 26 when the latch bar 28 is released, thus to hold said movable member in closed position and prevent withdrawal of the head of the animal from within the stanchion. Each locking member 33 is provided with a laterally extending pin 34 which bears against the upper edge of the connecting bar 23 and serves to hold said locking member in the path of movement of the adjacent movable member 26.

Depending from the latch bar 28 of each stanchion on one side of the pivot pin 29, is a rod 35, the lower end of which is connected with a trip lever 36. One end of each trip lever 36 is pivotally mounted at 37 on the adjacent stationary member 24, while the other end thereof is extended inwardly over the adjacent feed trough 16, so that as the calf or other animal inserts its head within the stanchion in an attempt to eat from the trough 16, the neck of the animal will depress the trip lever 36 and through the medium of the rod 35, release the latch bar 28, thereby to cause the spring 31 to move the member 26 of the stanchion to closed position, and in which position, it will be held by the locking member 33 so as to prevent the animal from withdrawing its head from said stanchion until the locking member 33 is released by the operator or other attendant.

In operation, a quantity of milk is poured into the upper receptacle 7 and the lower receptacle 19 filled with oats, grain or other solid feed. The operator then tilts the upper receptacle on its pivotal axis 8 which causes the spouts 15 to discharge the milk into the receiving trough 14 from whence it will flow through the spouts 15 into the respective feed troughs 16, the lower receptacle 19 being subsequently tilted so as to allow a predetermined quantity of oats or other grain to pass through the chutes 21 into the feed troughs. As the calf projects its head between the members of the stanchion, the neck of the calf will depress the trip lever 36 and automatically close the stanchion so as to prevent the calf from leaving the trough 16 until released by the attendant, and at the same time allowing one calf to eat without interference on the part of the other animals. By removing the cork or stopper 12 from the last partition and inserting the cork or stopper in the openings 11 of the other partitions, any number of calves may be fed at one time, the openings 11 permitting the milk to flow from one compartment 10 to another when the stopper 12 is removed from the last partition so as to allow, in the present device, five calves to be fed at one time.

It will of course be understood that the feeders may be made in different sizes and shapes and constructed so as to feed any desired number of calves or other animals at one time.

Having thus described the invention, what is claimed as new is:

1. A stock feeder including spaced uprights, a plurality of receptacles arranged one above the other and pivotally mounted between the uprights, a stationary trough interposed between the receptacles and secured to said uprights, a feed trough, an open-sided chute for directing the material from one of the receptacles into the feed trough, and a spout extending through the chute at the open side thereof for directing the material from the upper receptacle into said feed trough.

2. A stock feeder including spaced uprights having upper and lower sets of laterally extending arms of different lengths, a liquid receiving receptacle pivotally mounted on the upper short set of arms and provided with spaced transverse partitions forming a series of compartments, there being an opening formed in each partition, an auxiliary receptacle pivotally mounted on the lower long set of arms and adapted to receive solid material, feed troughs disposed beneath said receptacles, means for directing the fluid from the liquid receptacle into the feed troughs, separate means for directing the solid material into said feed troughs, and a plug adapted to enter the openings in the partitions for cutting off communication between the adjacent compartments.

3. A stock feeder including a supporting frame having upper and lower sets of laterally extending arms of different lengths, a liquid receiving receptacle pivotally mounted on the upper short set of arms and provided with laterally extending nozzles, a stationary receiving trough secured to the frame beneath the liquid receptacle and adapted to receive the liquid from said receptacle, a plurality of feed troughs, means for conducting the liquid from the receiving trough to the respective feed troughs, an auxiliary receptacle pivotally mounted on the lower long set of arms and adapted to contain a quantity of grain, and downwardly inclined chutes arranged beneath the grain receiving receptacle for directing the grain into the feed troughs.

In testimony whereof, I affix my signature in presence of two witnesses.

JOSEPH RAU. [L. S.]

Witnesses:
M. M. CARMICHAEL,
O. W. STEVENSON.

Copies of this patent may be obtained for five cents each, by addressing the "Commissioner of Patents, Washington, D. C."